United States Patent
Martinez et al.

(10) Patent No.: US 7,447,113 B2
(45) Date of Patent: Nov. 4, 2008

(54) KIRCHHOFF PRESTACK TIME MIGRATION METHOD FOR PS WAVES

(75) Inventors: Ruben D. Martinez, Sugar Land, TX (US); Chuanwen Sun, Katy, TX (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 10/958,827

(22) Filed: Oct. 5, 2004

(65) Prior Publication Data

US 2005/0105393 A1 May 19, 2005

Related U.S. Application Data

(60) Provisional application No. 60/513,914, filed on Oct. 23, 2003.

(51) Int. Cl.
G01V 1/24 (2006.01)
G01V 1/28 (2006.01)

(52) U.S. Cl. .............................. 367/38; 367/50; 367/51

(58) Field of Classification Search ............. 367/36–38, 367/40, 50, 75, 51; 702/18
See application file for complete search history.

(56) References Cited

U.S. PATENT DOCUMENTS

| | | | | |
|---|---|---|---|---|
| 4,415,999 A * | 11/1983 | Moeckel et al. | ............... | 367/73 |
| 4,611,311 A * | 9/1986 | Frasier | ......................... | 367/38 |
| 4,745,585 A * | 5/1988 | Larner | ......................... | 367/50 |
| 4,888,742 A * | 12/1989 | Beasley | ....................... | 367/53 |
| 5,596,547 A * | 1/1997 | Bancroft et al. | ............... | 367/51 |
| 5,610,875 A * | 3/1997 | Gaiser | ......................... | 367/75 |
| 6,081,482 A * | 6/2000 | Bevc | ............................. | 367/57 |
| 6,292,754 B1 * | 9/2001 | Thomsen | ....................... | 702/14 |
| 6,466,873 B2 * | 10/2002 | Ren et al. | ....................... | 367/51 |
| 6,785,612 B1 * | 8/2004 | Zhang | ......................... | 702/14 |
| 2002/0105857 A1 * | 8/2002 | Ren et al. | ....................... | 367/21 |
| 2004/0024530 A1 * | 2/2004 | Wang et al. | ..................... | 702/1 |

OTHER PUBLICATIONS

Dai, et al. "Anisotropic migration and model building for 4C seismic data: A case study from Alba." 71$^{st}$ Annual SEG Int'l Meeting. Sep. 2001.*

Li, et al. "Converted-wave traveltime equations in layered anisotropic media: An overview." EAGE 65$^{th}$ Conference and Exhibition. Jun. 2003.*

Wang, et al. "Converted-wave prestack time migration for VTI media." EAGE 64$^{th}$ Conference and Exhibition. May 2002.*

(Continued)

*Primary Examiner*—Jack W Keith
*Assistant Examiner*—Scott A Hughes
(74) *Attorney, Agent, or Firm*—E. Eugene Thigpen; Richard A. Fagin

(57) ABSTRACT

A method is disclosed for migrating seismic data which includes determining travel time of a compressional wave from a source location to a scatter point, taking into account ray bending. Travel time of a shear wave from the scatter point to a receiver location is determined, taking into account ray bending at the interfaces between subsurface strata. The determined travel times are then used to migrate the seismic data. In one embodiment, the travel times take account of vertically transversely isotropic media with a vertical symmetry axis.

12 Claims, 6 Drawing Sheets

OTHER PUBLICATIONS

Wu, et al. "Imaging steep sub-salt structures using converted wave paths." SEG Int'l Exposition and Meeting. Sep. 2001.*

Zhang, et al. "Velocity Update via Joint Velocity Inversion for Anisotropic Depth Migration." SEGIE Oct. 2002.*

Sun, et al. "Optimized 6th order NMO correction for long offset data." SEG Int'l Exposition and 72nd Annual Meeting, Salt Lake City, Utah, Oct. 6-11, 2002.*

Taner, et al. "Velocity Spectra-digital Computer Derivation and Applications of Velocity Functions." Geophysics, Dec. 1969.*

Alkhalifah, Tariq. The offset-midpoint traveltime pyramid in transversely isotropic media. Geophysics, Jul.-Aug. 2000.*

Jurado, et al. "Fast 3D two-point ray-tracing for traveltime tomography." KIM Research Consortium, Jul. 2, 1998.*

Alkhalifah, Tariq, "The offset-midpoint traveltime pyramid in transversely isotropic media", Geophysics, 2000, pp. 1316-1325, vol. 65, No. 4.

Harrison, Mark, .Paul, Processing of P-SV surface-seismic data: Anisotropy analysis, dip moveout, and migration: Ph.D. Thesis, Univ. of Calgary, 1992, pp. iii-iv, Abstract.

Li, Xiang-Yang, Yuan, Jerry, "Converted-wave imaging in inhomogeneous, anisotropic media: Part 1—parameter estimation", EAGE 63rd Conference & Technical Exhibition, 2001, pp. 1-4, Expanded Abstracts, Amsterdam, The Netherlands.

Sun, Chuanwen, Ruben D. Martinez, "Amplitude preserving V(z) pre-stack Kirchhoff time migration for VTI media", First Break, 2001, pp. 618-624, vol. 19.

Thomsen, Leon, "Converted-wave reflection seismology over inhomogeneous, anisotropic media", Geophysics, 1999, pp. 678-690, vol. 64, No. 3.

Tsvankin, Ilya, Thomsen, Leon, "Nonhyperbolic reflection moveout in anisotropic media", Geophysics, 1994, pp. 1290-1304, vol. 59, No. 8.

Wang, Weizhong, Pham, Long D., "Converted-wave prestack imaging and velocity analysis by pseudo-offset migration", EAGE 63rd Conference & Technical Exhibition, 2001, L-12, Expanded Abstracts, Amsterdam, The Netherlands.

Yuan, Jerry, Li, Xiang-Yang, Ziolkowski, Anton, "Converted-wave moveout analysis in layered anisotropic media—a case study", EAGE 63RD Conference & Technical Exhibition, 2001, L-27, Expanded Abstracts, Amsterdam, The Netherlands.

* cited by examiner

KIRCHHOFF PRESTACK TIME MIGRATION METHOD FOR PS WAVES

CROSS-REFERENCE TO RELATED APPLICATIONS

The subject matter of this application is related to U.S. patent application Ser. No. 09/918,981, having a filing date of Jul. 31, 2001, which patent application is incorporated herein by reference. This application claims priority under 35 U.S.C. 119(e) to U.S. provisional application No. 60/513,914 filed on Oct. 23, 2003.

STATEMENT REGARDING FEDERALLY SPONSORED RESEARCH OR DEVELOPMENT

Not applicable.

BACKGROUND OF THE INVENTION

1. Field of the Invention

The invention relates generally to the field of processing of three dimensional seismic data. More specifically, the invention relates to methods for migrating three dimensional seismic data, wherein seismic data recordings comprise converted compressional to shear waves.

2. Background Art

Three-dimensional ("3D") reflection seismic data are being acquired on an increasingly routine basis. Because of the numbers of seismic receivers used in a typical 3D seismic data survey, 3D seismic surveys typically include large volumes of seismic data. These large volumes of data offer the potential for very high-resolution 3D images of the subsurface geology and subsequent estimation of the earth's physical properties.

In seismic surveying, energy from all of the seismic energy sources used in the survey propagates from a subsurface "scatter point" to all the seismic receivers used in acquiring seismic data. Consequently, all recorded traces (called "input" traces for purposes of seismic processing) can contain energy from a particular scatter-point. Because the input traces have a finite recording time, the scattered energy is restricted to traces within the prestack migration aperture of the scattering point. The objective of prestack migration is to gather the seismic energy from all the recorded traces within the prestack migration aperture and sum it back to the scatter-point location.

The accuracy of the migration is related to the accuracy of the calculated seismic signal travel times that are used for migrating the data. The key point is to calculate accurate travel times in order to have better migration imaging. In homogeneous media, seismic travel times, as functions of offset (equivalent distance between the source and receiver along the surface) and common imaging point ("CIP"), are determinable by a simple analytical equation, commonly referred to as the double-square root ("DSR") equation. The DSR equation to compute travel times is fundamental in migration. The DSR equation is exact in the sense that there are no error-terms dependent on dip angle and offset angle.

In homogeneous media, the velocity of seismic energy through the various subsurface strata is assumed to be constant, and straight rays (a "ray" being a calculated or determined travel path of seismic energy from the source to a reflection point and back to a receiver) are used for travel time computations at any selected imaging point. For media that are vertically inhomogeneous (meaning that the velocity changes with respect to depth in the earth), the RMS (root mean square) average velocity may be used to calculate travel times. However, if there are such vertical changes in velocity, there will be ray-bending at the interfaces between earth strata having different velocities (refraction), and if straight ray paths are assumed, the ray-bending will not be accounted for in the travel time calculations. As velocity changes become greater, the quality of the migration diminishes if ray-bending is not taken into account.

Although conventional approximation of the travel times (straight ray approximation) is substantially accurate for small offset-to-depth ratios, with increasing ratios of offset-to-depth, the accuracy of such conventional approximation diminishes, because the amount of ray bending or refraction is related to the incidence angle of the seismic energy. The incidence angle increases with offset to depth ratio in the presence of ray bending. Therefore, in migrating long-offset seismic data, conventional approximations (straight ray) are not suitable, because ray-bending is not taken into account.

Ray-bending can be determined by using standard ray tracing techniques, however, standard ray tracing has to be performed at every output (image) location and is thus computationally expensive to perform.

SUMMARY OF THE INVENTION

In one embodiment, the invention comprises a method for migrating seismic data which includes determining travel time of a compressional wave from a source location to a scatter point, taking into account ray bending; determining travel time of a shear wave from the scatter point to a receiver location, taking into account ray bending at the interfaces between subsurface strata; and utilizing the determined travel time for migrating the seismic data.

Another aspect of the invention is a computer program stored in a computer-readable medium. A program according to this aspect of the invention includes logic operable to cause a programmable computer to perform steps including determining travel time of a compressional wave from a source location to a scatter point, taking into account ray bending; determining travel time of a shear wave from the scatter point to a receiver location, taking into account ray bending at the interfaces between subsurface strata; and utilizing the determined travel time for migrating the seismic data.

Other aspects and advantages of the invention will be apparent from the following description and the appended claims.

DETAILED DESCRIPTION

One aspect of the invention relates to methods for migrating PS seismic data. PS seismic data are data derived from seismic signals that were imparted into the earth as pressure ("P" or compressional) waves, and then reflected from subsurface interfaces as shear ("S") waves. The invention uses a prestack time migration algorithm that takes into account ray-bending that occurs at subsurface interfaces between strata having different shear wave seismic velocities as well as different pressure wave seismic velocities.

In a first embodiment, the double square root (DSR) equation that is commonly used to calculate travel times for small offset to depth ratio migration is improved by including higher order moveout terms. In principle, the moveout equation for vertically isotropic (V(z)) media (meaning isotropic media having a velocity that varies with depth) consists of an infinite series of higher order terms. The number of higher order terms needed to achieve a particular level of accuracy depends upon the vertical velocity profile and the propagation angle. A new series is derived which is based on a large offset-to-depth ratio, rather than a small ratio, in order to obtain a travel time approximation with accuracy that is comparable to ray tracing travel times, even at large offset to depth ratios. This first embodiment is useful for computing travel times for subsurface earth strata that are vertically isotropic but vertically inhomogeneous.

In a second embodiment, PS-wave prestack Kirchhoff time migration for transversely isotropic media with a vertical symmetry axis (VTI media) is implemented using an offset-midpoint travel time equation. For both V(z) and VTI media, the earth is assumed to consist essentially of horizontal layers so that the velocity profile is simply a function of depth or time, which means that the earth is assumed to be isotropic in the horizontal direction, but may be anisotropic in the vertical direction.

Figure 1A:
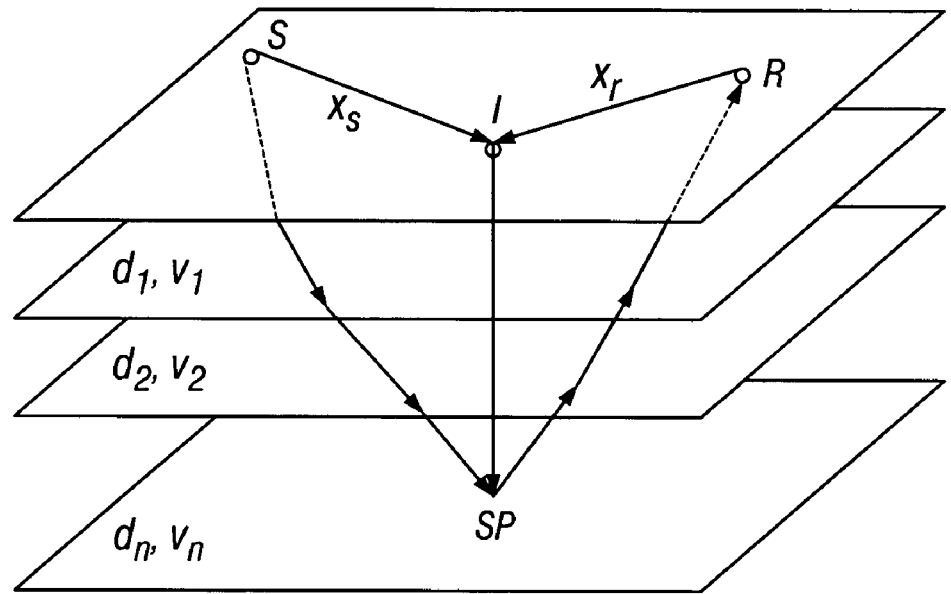
FIG. 1A shows Snell's law propagation paths of seismic energy in a horizontally layered medium for a surface seismic survey.
Figure 1B:
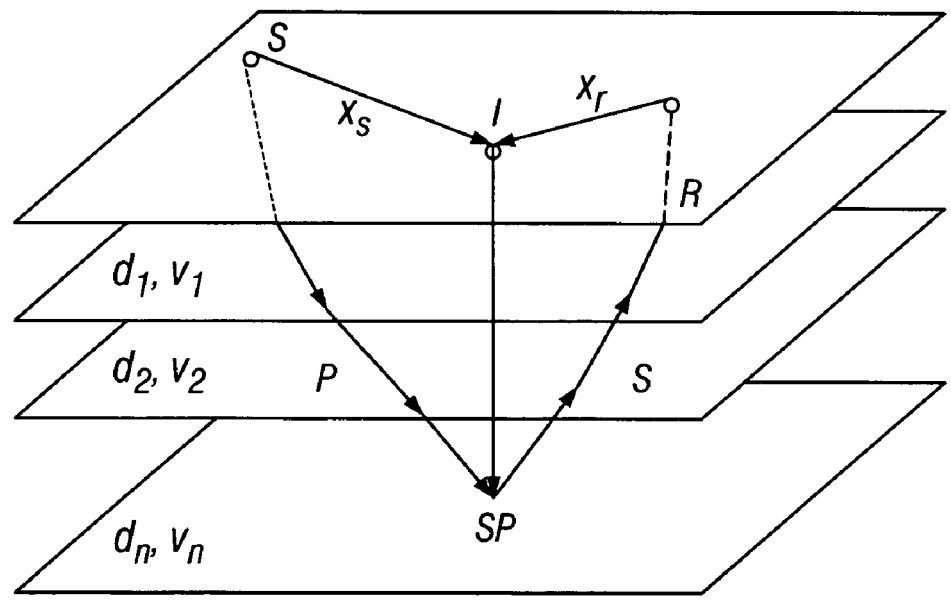
FIG. 1B shows Snell's law propagation paths of seismic energy in a horizontally layered medium for an ocean bottom cable seismic survey.

FIG. 1A shows a seismic energy travel path from a first source S to a first scatter point SP, and from the first scatter point SP to a first receiver R. The location at the earth's surface directly above the first scatter point SP is designated as I, or the imaging location. FIG. 1A shows the seismic energy travel path from only one source location and back to only one receiver location. It should be understood that in a conventional 3D seismic survey, in which there are a plurality of source locations and receiver locations, there is a travel path from each source location to each receiver location through the scatter point SP. It is the object of the migration process to migrate the mode-converted shear wave energy detected at each receiver point that was reflected from a particular scatter point back to the scatter point.

In FIG. 1A, for P-waves, the terms $d_k$, $v_k$ represent the thickness and interval P-wave velocity at the $k^{th}$ layer, respectively. Accordingly, the downgoing or upgoing seismic travel time can be expressed as:

$$T_x = \sum_{k=1}^{n} \frac{p_k}{v_k} \rightarrow \min \tag{1}$$

$$p_k^2 = d_k^2 + x_k^2 \tag{2}$$

-continued $$X = \sum_{k=1}^{n} x_k \tag{3}$$

where $X=x_r$, the distance between the receiver position and the imaging point, or $X=x_s$, which is the distance between the source position and the imaging point. In the above equations, d represents vertical distance, and x represents horizontal distance, so that p represents the total distance traveled by a seismic signal through a stratum. $T_x$ is the travel time of the seismic signal for the travel path from the source location to the scatter point, or from the scatter point to the receiver location, for which the propagation time is a minimum.

The minimum requirement of equation (1) under the constraint in equation (3) leads to the equations, $$\frac{\partial T_x}{\partial x_k} = \frac{x_k}{p_k v_k} = \lambda \tag{4}$$

where $\lambda$ is a Lagrange multiplier. $\lambda$ is also known as the ray parameter or Snell's parameter. $\lambda$ is related to the interval velocity of a given layer ($v_k$) and the incidence angle ($\theta_k$) at the base of that layer by means of Snell's Law:

$$\lambda = \frac{\sin\theta_k}{v_k} \tag{4a}$$

From equations (2) and (4) the following expression can be determined:

$$x_k^2 = \frac{\lambda^2 v_k^2 d_k^2}{1 - \lambda^2 v_k^2} \tag{5}$$

where $$\frac{x_k^2}{p_k^2 v_k^2} = \frac{x_k^2}{(d_k^2 + x_k^2)v_k^2} = \lambda^2$$

Thus, equations for x and $T_x$ can be determined as follows:

$$X = \lambda \sum_{k=1}^{n} \frac{v_k d_k}{\sqrt{1 - \lambda^2 v_k^2}} \tag{6}$$

$$T_x = \sum_{k=1}^{n} \frac{d_k / v_k}{\sqrt{1 - \lambda^2 v_k^2}} \tag{7}$$

Equations (6) and (7) are the parametric forms of the time-distance relationship with respect to $\lambda$. Equations (6) and (7) relate the offset distance to the travel time where the velocity varies with depth. As $\lambda$ varies from 0 to 1/v, where v=max($v_1$, $v_2$, ..., $v_n$), X will vary from 0 to infinity. From the foregoing constraints, an expression for $\lambda$ with respect to interval velocity can be determined as follows:

$$\lambda = \frac{\sin\theta_k}{v_k} \qquad (8)$$

where $\theta_k$ is the angle of incidence, which is provided by equation (4a).

According to a mathematical process well known to those of ordinary skill in the art, $T_x$ may be approximated as an infinite series using equations (6) and (7).

Let $$T_x^2 = c_1 + c_2 x^2 + c_3 x^4 + c_4 x^6 + c_5 x^8 + c_6 x^{10} + \qquad (9)$$

where the values of $c_1$, $c_2$, $c_3$ $c_4$, etc. can be determined by the expressions:

$$c_1 = a_1^2; \; c_2 = \frac{a_1}{a_2}; \; c_3 = \frac{a_2^2 - a_1 a_3}{4 a_2^4}; \text{ and} \qquad (10a)$$

$$c_4 = \frac{2 a_1 a_3^2 - a_1 a_2 a_4 - a_2^2 a_3}{8 a_2^7}$$

in which the values of $a_1$, $a_2$, etc, can be determined by the expressions:

$$a_1 = 2 \sum_{k=1}^{n} \frac{d_k}{v_k}; \; a_2 = 2 \sum_{k=1}^{n} v_k d_k; \; a_3 = 2 \sum_{k=1}^{n} v_k^3 d_k; \text{ and} \qquad (10b)$$

$$a_4 = 2 \sum_{k=1}^{n} v_k^5 d_k$$

To obtain a travel time approximation with good accuracy at large offset to depth ratios, in accordance with the present invention, a new series is derived from equation (9) according to the following expression:

$$T_x \approx \sqrt{c_1 + c_2 x^2 + c_3 x^4 + c_4 x^6 + c_5 x^8 + c_6 x^{10} + \ldots} \qquad (11)$$

$$\approx \sqrt{(c_1 + c_2 x^2 + c_3 x^4)\left(1 + \frac{c_4 x^6 + c_5 x^8 + c_6 x^{10} + \ldots}{c_1 + c_2 x^2 + c_3 x^4}\right)}$$

$$\approx \sqrt{(c_1 + c_2 x^2 + c_3 x^4)}\left(1 + \frac{1}{2}\frac{c_4 x^6 + c_5 x^8 + c_6 x^{10} + \ldots}{c_1 + c_2 x^2 + c_3 x^4} + \ldots\right)$$

$$\approx \sqrt{(c_1 + c_2 x^2 + c_3 x^4)}\left(1 + \frac{1}{2} CC \frac{c_4 x^6}{c_1 + c_2 x^2 + c_3 x^4}\right)$$

in which CC is an empirically derived constant that depends on the new series. CC may also be understood as a stabilization factor. It has been observed that useful results are typically obtained if a value of 0.6666 is utilized for CC.

In order to use equation (11) to migrate converted waves (PS waves), equation (11) can be partitioned into upgoing ($T_g$) and downgoing ($T_g$) travel times according to the following expression:

$$T = T_g + T_s \qquad (12)$$

$$= T_{g_o}\left(1 + \frac{1}{2} CC \frac{c_{4_s} x_r^6}{T_{g_o}^2}\right) + T_{s_o}\left(1 + \frac{1}{2} CC \frac{c_{4_p} x_s^6}{T_{s_o}^2}\right)$$

where, $$T_{g_o} = \sqrt{(c_{1_s} + c_{2_s} x^2 + c_{3_s} x^4)}, \; T_{s_o} = \sqrt{(c_{1_p} + c_{2_p} x^2 + c_{3_p} x^4)}$$

in which $c_{1_s}$, $c_{2_s}$, $c_{3_g}$ and $c_{4_g}$ represent the shear (S) wave series coefficients, $c_{1_p}$, $c_{2_p}$, $c_{3_p}$ and $c_{4_p}$ represent the compressional (P) wave series coefficients; and $T_{g_o}$ and $T_{s_o}$ represent the fourth order approximation to travel time of the seismic energy from the image point to the seismic receiver position and the source position to the image point, respectively.

In equation (12), the fourth and sixth order series correspond to large offset travel times. Equation (12) is an optimized sixth order travel time equation. It is more accurate than the conventional sixth order equation. The accuracy comes by minimizing truncation effects in the optimized sixth order equation. Thus, equation (12) can be used to calculate travel times for large offset-to-depth ratios.

The required parameters to perform isotropic PS prestack migration are $V_{c2}$ and $$\frac{T_{PS}}{2 T_{PP}}$$

(travel time ratios measured in the stacked data before migration). $V_{c2}$ is the RMS converted wave velocity measured in a conventional PS velocity analysis.

PS-wave prestack Kirchhoff time migration for transversely isotropic media with vertical symmetry axis (VTI media) can be implemented combining two offset-midpoint travel time equations, shown below as equations (13) and (13a). Although the derivation of such equations for VTI media requires approximations that pertain to high frequency and weak anisotropy, the resultant PS-wave offset-midpoint travel time equation for VTI media is substantially accurate for even strong anisotropy. The travel times are also dependent on only the following parameters: RMS converted wave, $V_{c2}$, velocity; the effective an elliptical parameter. $\eta_{\textit{eff}}$ and the $$\frac{T_{PS}}{2 T_{PP}}$$

travel time ratio. Equations (13) and (13a) are relationships well known to those of ordinary skill in the art.

In homogeneous VTI media, it has been demonstrated that P-wave velocity, $V_p$, and travel times are practically independent of S-wave velocity, even for strong anisotropy. This implies that for the migration purposes, the travel time for the downgoing P-wave can be calculated as follows, $$T_p = \sqrt{T_{p_o}^2 + \frac{x^2}{V_p^2} - \frac{2 \eta x^4}{V_p^2 [T_{p_o}^2 V_p^2 + (1 + 2\eta) x^2]}} \qquad (13)$$

Similarly, the travel time for the upgoing converted S-wave can be computed as, $$T_s = \sqrt{T_{s_o}^2 + \frac{x^2}{V_s^2} + \frac{2 \zeta x^4}{V_s^2 [T_{s_o}^2 V_s^2 + x^2]}} \qquad (13a)$$

Thus, the total downgoing and upgoing travel times for PS waves in VTI media can be determined by the expression:

$$T = \sqrt{T_{P_o}^2 + \frac{x_s^2}{V_p^2} - C_p(VTI)x_s^4} + \sqrt{T_{S_o}^2 + \frac{x_r^2}{V_s^2} - C_s(VTI)x_r^4} \quad (14)$$

where $$C_p(VTI) = \frac{2\eta}{V_p^2[T_{P_o}^2 V_p^2 + (1+2\eta)x_s^2]}, \text{ and } C_s(VTI) = \frac{-2\zeta}{V_s^2[T_s^2 V_s^2 + x_r^2]}$$

wherein $\zeta = \gamma_{eff}^2 \eta$, and $\gamma_{eff} = \frac{1}{\left((1+\gamma_0)\left(\left(\frac{V_c^2}{V_p^2}\right)-1\right)\right)}$ and in Equations (13) and (13a), $V_p$ and $V_s$ are compressional and shear velocities. For vertically inhomogeneous media, the velocities $V_p$, $V_s$ and $V_c$ become the RMS compressional, shear and converted wave velocities; $V_{p2}$, $V_{s2}$ and $V_{c2}$, while $\eta$ becomes $\eta_{eff}$.

The offset-midpoint travel time formula, equation (14), for VTI media is similar to the DSR equation for isotropic media, but is a function of the source and receiver ray parameters. In addition, the efficiency in travel time calculations using equation (14) allows its practical use in parameter estimation.

Equation (14) can be used to calculate the travel times in VTI media with small offset-to-depth ratios. In accordance with the present invention, a new method has been developed to take VTI into account for time migration without the need for ray tracing. Methods according to the invention may also be used for large offset-to-depth ratios.

The difference in calculated travel times between the isotropic straight ray using the DSR equation and VTI for vertically inhomogeneous media is given by the following expression:

$$\Delta T = \sqrt{T_{P_o}^2 + \frac{x_s^2}{V_{p2}^2}} - \sqrt{T_{P_o}^2 + \frac{x_s^2}{V_{p2}^2} - C_p(VTI)x_s^4} +$$

$$\sqrt{T_{S_o}^2 + \frac{x_r^2}{V_{s2}^2}} - \sqrt{T_{S_o}^2 + \frac{x_r^2}{V_{s2}^2} - C_s(VTI)x_r^4}$$

Because the travel time in VTI media is smaller than that of straight ray travel times, an approximation can be made to simplify the implementations in computer programming code:

$$\Delta T = \frac{C_p(VTI)x_s^4}{2\sqrt{T_{P_o}^2 + \frac{x_s^2}{V_{p2}^2}}} + \frac{C_s(VTI)x_r^4}{2\sqrt{T_{S_o}^2 + \frac{x_r^2}{V_{s2}^2}}} \quad (15)$$

Equation (15) is the travel time difference between a straight ray without the VTI effect and one with the VTI effect. Combining equations (15) and (12), the travel times that include ray bending in VTI media can be calculated as follows:

$$T = T_g + T_s - \Delta T = \quad (16)$$

-continued $$T_{g_o}\left(1 + \frac{1}{2}CC\frac{c_{4_s}x_r^6}{T_{g_o}^2}\right) + T_{s_o}\left(1 + \frac{1}{2}CC\frac{c_{4_p}x_s^6}{T_{s_o}^2}\right) - \Delta T(VTI)$$

Because the difference, $\Delta T$, is due to VTI, equations (15) and (12) can be combined for VTI and large offset-to-depth ratios to provide the calculation according to equation (16). Equation (16) takes both ray-bending and VTI effects into account for large offset-to-depth ratios.

Travel-time Calculation for a Multicomponent Ocean Bottom Survey

The foregoing explanation of calculating travel times for PS converted waves is based on the assumption that the seismic source and receiver locations are at substantially the same horizontal level (elevation). With reference to FIG. 2A, for ocean bottom seismic surveys, the seismic recording ("trace") data are relative to the surface, the receiver position is located at the water bottom, the water depth is represented by H, and water velocity is $V_w$.

The input velocity field is in terms of converted (C-wave) velocity, $V_{c2}$ (relative to the water bottom time), and associated time, $t_{co}$ (relative to the surface). In order to use equation (12), the interval velocities for P and S waves must be derived from the converted wave RMS, $V_{c2}$ and $T_{ps}/2T_{pp}$. Thus, it is necessary to derive separate RMS velocities for the P and S waves, respectively. From Equation (17), the compressional and shear RMS velocities may be calculated by the expression:

$$V_{p2} = V_{c2}\sqrt{\gamma} \text{ and } V_{s2} = \frac{V_{c2}}{\sqrt{\gamma}} \text{ where } \gamma = \frac{T_{ps}}{T_{pp}} - 1 \quad (17)$$

however, $V_{p2}$ and $V_{s2}$ are relative to the water bottom. For the P wave, the ray starts bending at the surface, thus it is necessary to obtain the RMS velocity from the surface. The RMS P wave velocity from the surface can be determined by the expression:

$$V_{p2_{surface}} = \sqrt{\frac{\sum_{i=1}^{n} V_i^2 T_i}{\sum_{i=1}^{n} T_i}} = \sqrt{\frac{V_w^2 T_w + \sum_{i=2}^{n} V_i^2 T_i}{T_w + \sum_{i=2}^{n} T_i}} \quad (18)$$

The RMS velocity which is relative to the water bottom may be determined by the expression:

$$V_{p2} = \sqrt{\frac{\sum_{i=2}^{n} V_i^2 T_i}{\sum_{i=2}^{n} T_i}} \quad (19)$$

Substituting equation (17) into equation (19) provides the following expression:

$$\sum_{i=2}^{n} V_i^2 T_i = V_{p2}^2 \cdot \sum_{i=2}^{n} T_i = V_{c2}^2 \cdot \gamma \sum_{i=2}^{n} T_i \quad (20)$$

Substituting equation (20) into equation (18), provides an expression for calculating the P wave RMS velocity from the surface for the P wave:

$$V_{P_{rms}} = \sqrt{\frac{V_w^2 T_w + \sum_{i=2} V_i^2 T_i}{T_w + \sum_{i=2} T_i}} = \sqrt{\frac{V_w^2 T_w + V_{c2}^2 \cdot \gamma \sum_{i=2} T_i}{T_w + \sum_{i=2} T_i}} \quad (21)$$

In addition, the ratio $T_{ps}/2T_p$ is relative to the surface. When the tables are built for the constants $c_{1_g}$, $c_{2_g}$, $c_{3_g}$, $c_{4_g}$ of the shear S wave coefficients, and $c_{1_p}$, $c_{2_p}$, $c_{3_p}$, $c_{4_p}$ of the P wave coefficients, the shear wave constants are relative to the water bottom, however, the compressional wave constants are relative to the surface.

In a preferred mode of performing the present invention, the following steps are performed. Two ray-bending travel time tables are generated. As the travel times for the propagation of a seismic signal from the source position to a common imaging point and from the common imaging point to the receiver position are calculated, the calculated propagation times are stored in the travel time tables. One travel time table is for the downgoing P wave. The other travel time table is for the upgoing, converted mode S wave. Travel times can be calculated at selected imaging times (for time migration) which may be, for example, every 30 milliseconds.

Travel times of the seismic signal at intermediate points between the image point locations where travel time is calculated according to the present process may be interpolated. The interpolation may conveniently be performed by converting the recorded (input) trace to the frequency domain and performing the interpolation in the frequency domain. This type of interpolation process may also be referred to as super sampling.

Velocity and mute tables are set up for each CMP (common mid point) and then the migration begins.

The method has the capability of using multiple processors. User specified output target bins (common imaging points) are divided equally among the processors. In a preferred embodiment of the invention n processor are used and each processor is programmed to calculate each $n^{th}$ common imaging point. The first processor reads a trace (record) and broadcasts this trace (record) to all processors, then all processors begin imaging the data according to the respectively programmed image point.

Figure 2:
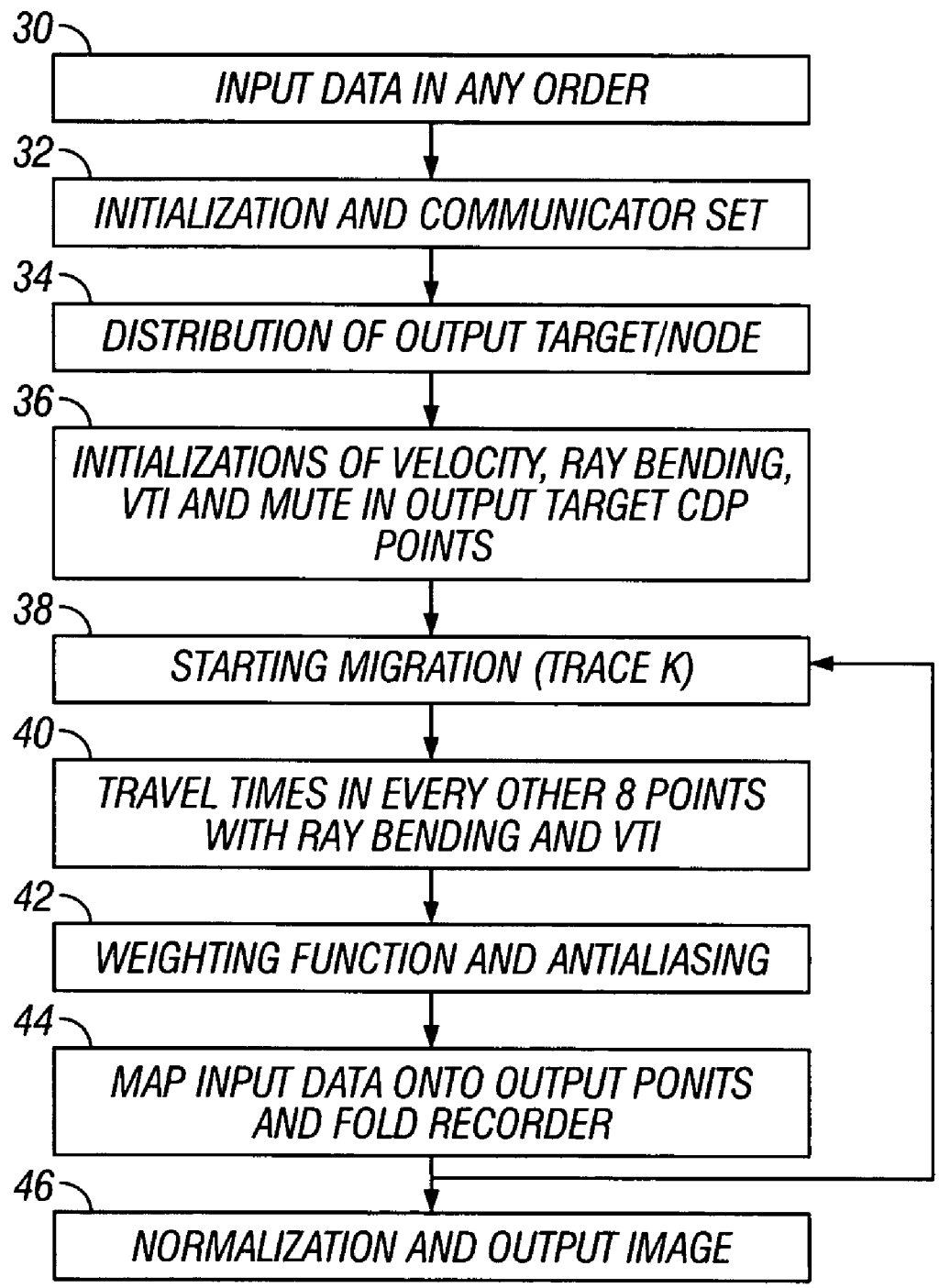
FIG. 2 shows a typical process flow path for an embodiment of the invention.

FIG. 2 shows a typical process sequence for one embodiment of the present invention. In block 30, data are input. In block 32 initialization and communication are set up. In block 34, distribution of the output targets/nodes is performed. In block 36, initialization of velocity, ray bending, VTI and mute in the output target CMP points are performed. In block 38, migration is started. In block 40, travel times in every other eight points with bending and VTI are computed. In block 42, weighting functions and anti-aliasing filtering are performed. In block 44, input data are mapped onto output points and fold recorder. The process then loops back to block 38 until processing of the data set is completed. The process in block 46 then comprises normalization and output image generation.

Figure 3:
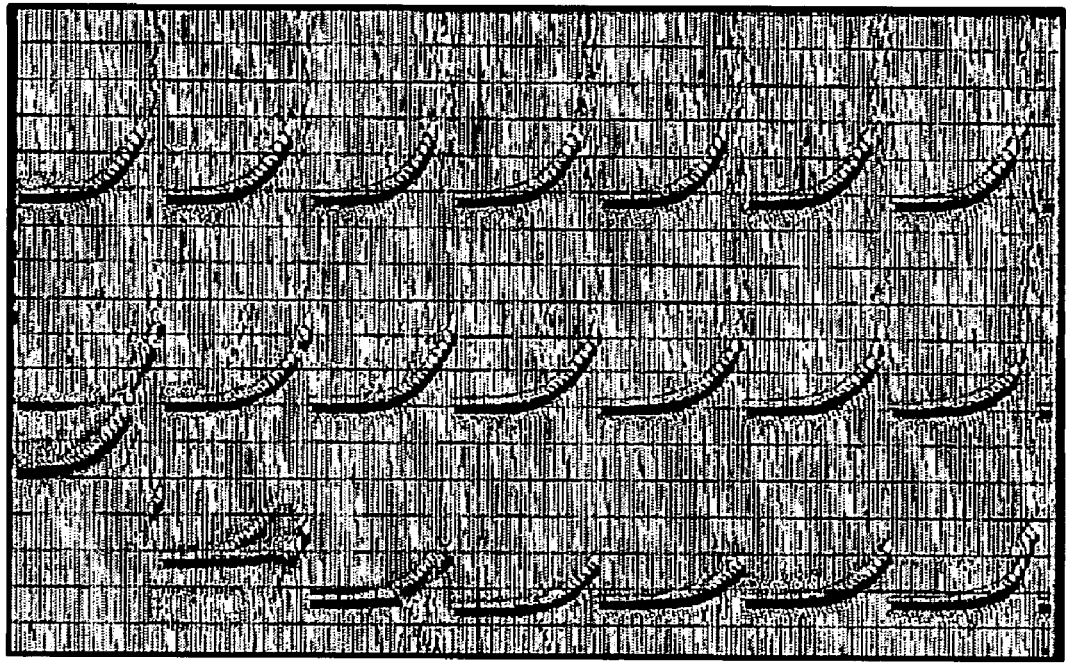
FIG. 3 shows an image gather output generated by straight rays.
Figure 4:
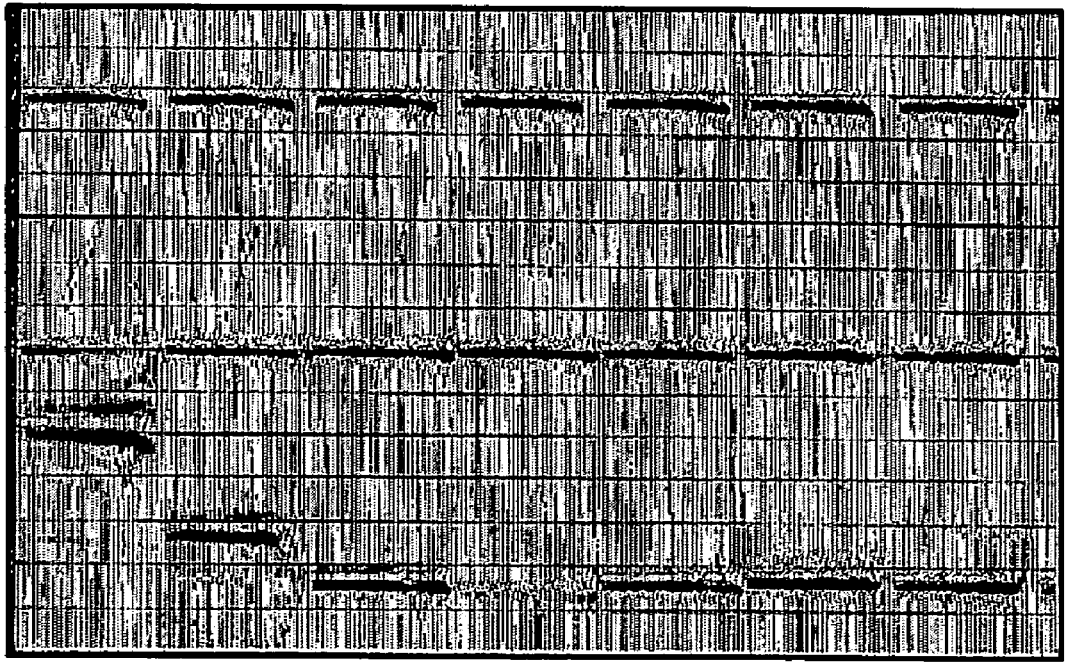
FIG. 4 shows an image gather output generated in accordance with an embodiment of the present invention.
Figure 5:
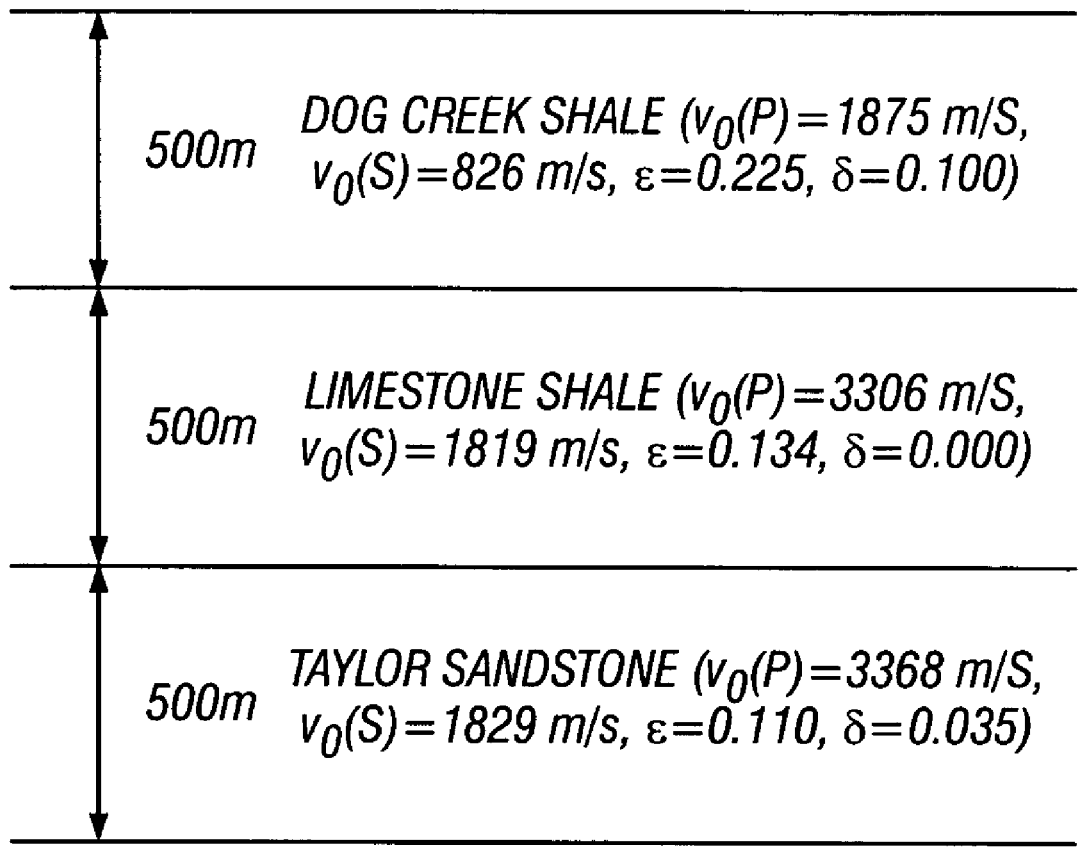
FIG. 5 shows a velocity model for the synthetic PS wave in VTI media
Figure 6:
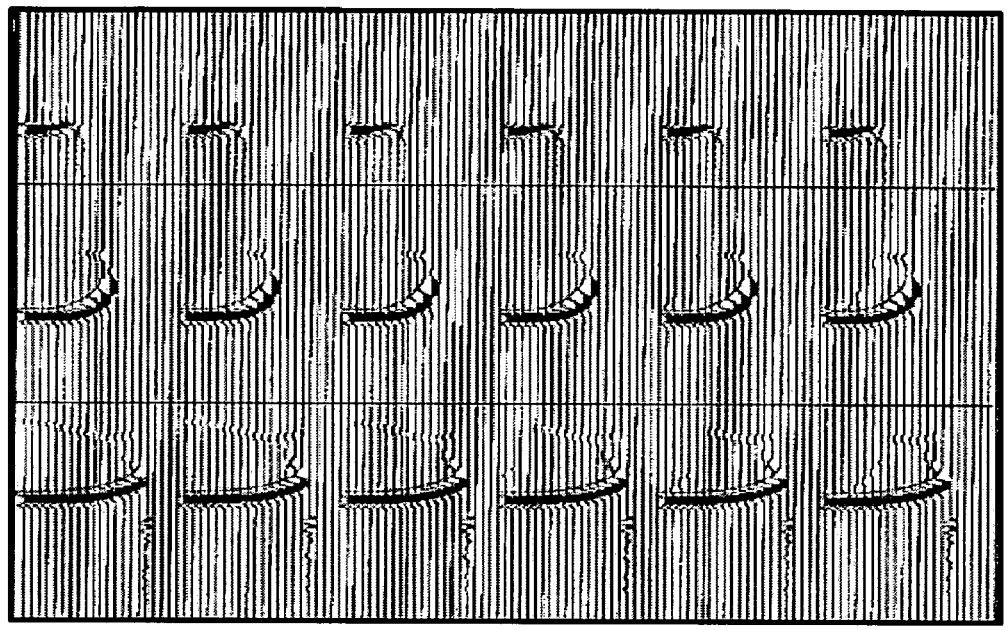
FIG. 6 shows the migrated image gather output without VTI corrections
Figure 7:
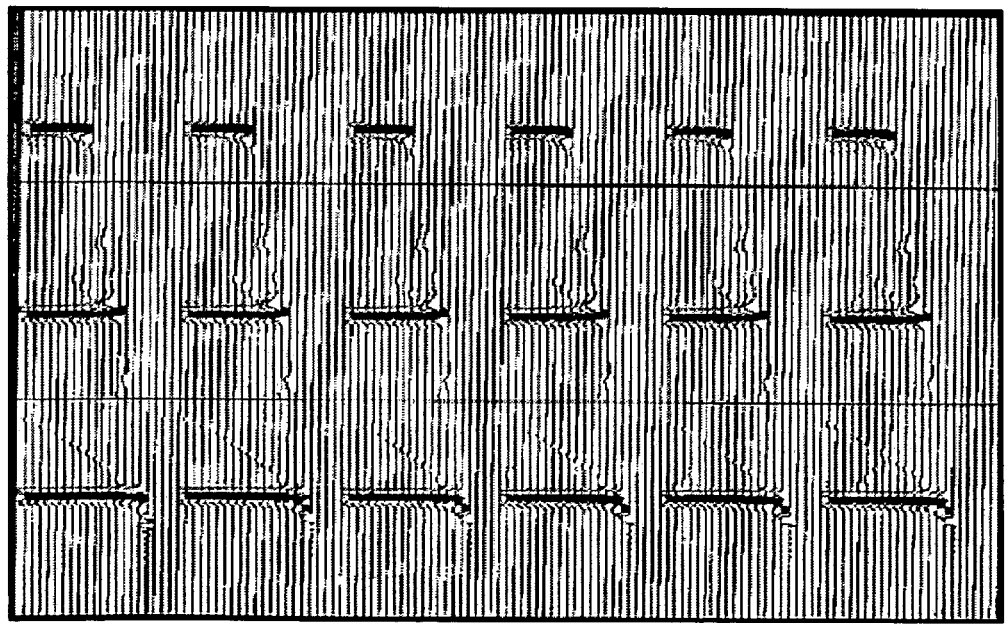
FIG. 7 shows the migrated image gather output with VTI corrections.
Figure 8:
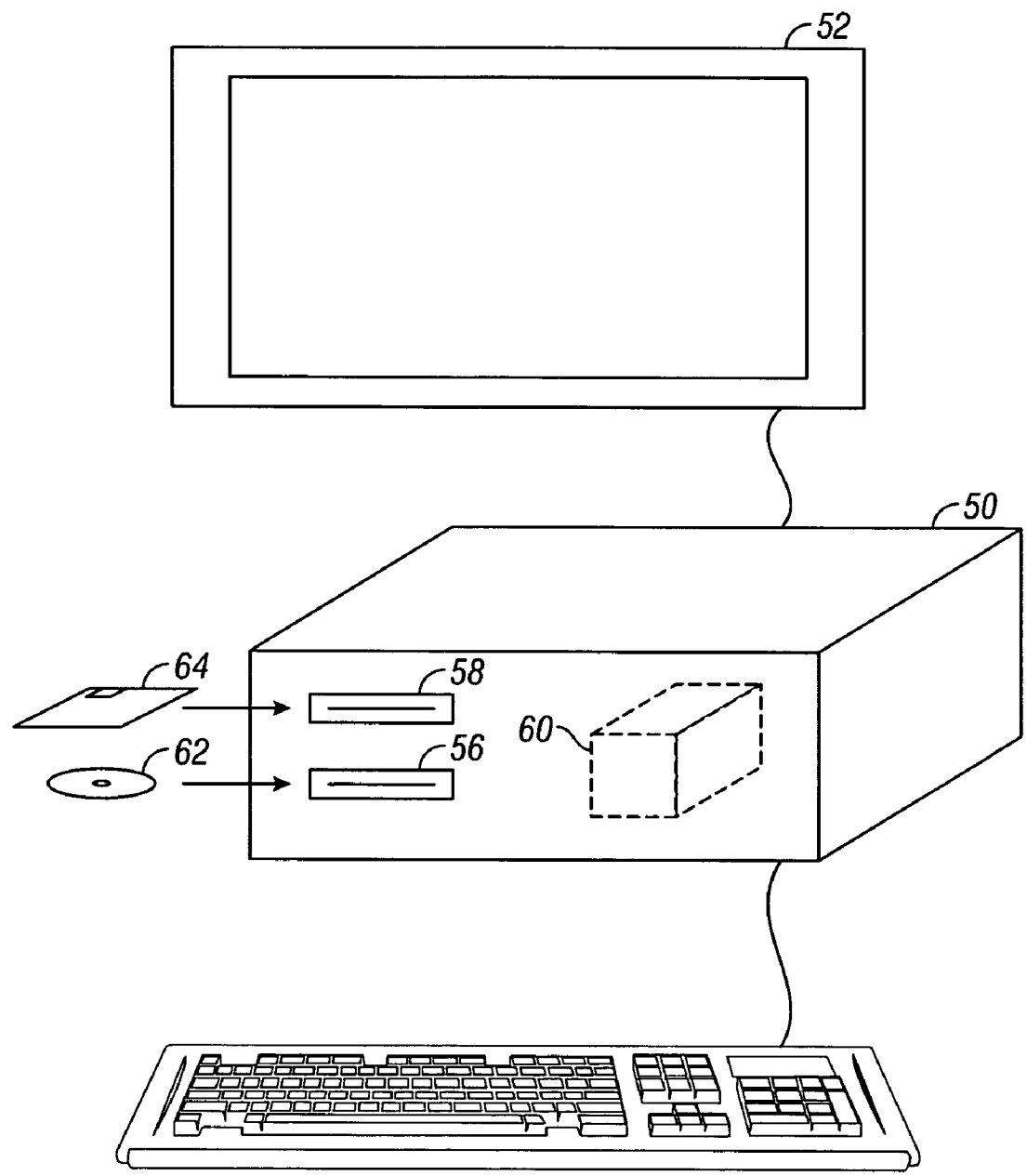
FIG. 8 shows a programmable computer adapted to read a program stored in a computer readable medium according to one aspect of the invention.

The results of using a process according to the invention are illustrated in FIGS. 3-7. FIG. 3 shows an image gather output without taking ray bending into account. FIG. 4 shows an image gather output generated in accordance with the present invention. FIG. 5 illustrates a velocity model for a synthetic PS wave in VTI media. FIG. 6 shows the results of migrating the data without VTI correction. FIG. 7 shows the results of migrating the data with VTI correction.

In another aspect, the invention relates to computer programs stored in a computer readable medium. Referring to FIG. 4, the foregoing process as explained with respect to FIG. 2, can be embodied in computer-readable code stored on a computer readable medium, such as floppy disk 68, CD-ROM 70 or magnetic hard drive 66 forming part of a general purpose programmable computer. The computer, as known in the art, includes a central processing unit 60, a user input device such as a keyboard 62 and a user display 64 such as a flat panel LCD display or cathode ray tube display. According to this aspect of the invention, the computer readable medium includes logic operable to cause the computer to execute steps as set forth above and explained with respect to FIG. 2.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for migrating seismic data, comprising:
   determining travel time of a compressional wave from a source location to a scatter point using a sixth order series expansion travel time equation that accounts for ray bending at interfaces between subsurface strata, the equation optimized to minimize truncation effects;
   determining a travel time of a shear wave from the scatter point to a receiver location using a sixth order series expansion travel time equation that accounts for ray bending at interfaces between subsurface strata, the equation optimized to minimize truncation effects;
   using the determined travel times to migrate the seismic data to an image point; and
   at least one of storing and displaying the migrated seismic data.

2. The method of claim 1 wherein the travel times are calculated for isotropic media.

3. The method of claim 1 wherein the travel times are calculated for transversely isotropic media with a vertical axis of symmetry.

4. The method of claim 1 wherein the source is near the sea surface, the receiver is on the sea floor and the compressional wave velocity is modified to include the travel time of the wave through the water layer.

5. The method of claim 1 wherein the optimized sixth order series expansion travel time equation is:

$$T = T_g + T_s = T_{g_o}\left(1 + \frac{1}{2}CC\frac{c_{4_s}x_r^6}{T_{g_o}^2}\right) + T_{s_o}\left(1 + \frac{1}{2}CC\frac{c_{4_p}x_s^6}{T_{s_o}^2}\right)$$

in which, $$T_{g_o} = \sqrt{(c_{1_s} + c_{2_s}x^2 + c_{3_s}x^4)}, \quad T_{s_o} = \sqrt{(c_{1_p} + c_{2_p}x^2 + c_{3_p}x^4)}$$

in which:
   T=travel time,
   ($T_g$)=upgoing travel time,
   ($T_s$)=downgoing travel time,
   CC=an empirically derived constant,
   x=a distance between the image point and a respective one of the source location and the receiver location, $c_{1_s}$, $c_{2_s}$, $c_{3_s}$ and $c_{4_s}$ represent shear (S) wave series coefficients, $c_{1_p}$, $c_{2_p}$, $c_{3_p}$ and $c_{4_p}$ represent compressional (P) wave series coefficients, and $T_{g_o}$ and $T_{s_o}$ represent a fourth order approximation of travel time of seismic energy from the image point to the receiver position and from the source position to the image point, respectively.

6. The method of claim 5 wherein the optimized sixth order series expansion travel time equation accounts for ray bending in a transversely isotropic media with a vertical symmetry axis (VTI) is:

$$T = T_g + T_s - \Delta T = T_{g_o}\left(1 + \frac{1}{2}CC\frac{c_{4_s}x_r^6}{T_{g_o}^2}\right) + T_{s_o}\left(1 + \frac{1}{2}CC\frac{c_{4_p}x_s^6}{T_{s_o}^2}\right) - \Delta T(VTI)$$

wherein, $$T_{g_o} = \sqrt{(c_{1_s} + c_{2_s}x^2 + c_{3_s}x^4)}, \quad T_{s_o} = \sqrt{(c_{1_p} + c_{2_p}x^2 + c_{3_p}x^4)}$$

$$\Delta T = \frac{C_p(VTI)x_s^4}{2\sqrt{T_{P_o}^2 + \frac{x_s^2}{V_{p2}^2}}} + \frac{C_s(VTI)x_r^4}{2\sqrt{T_{S_o}^2 + \frac{x_r^2}{V_{s2}^2}}}$$

$$C_p(VTI) = \frac{2\eta}{V_p^2[T_{P_o}^2 V_p^2 + (1+2\eta)x_s^2]}, \text{ and } C_s(VTI) = \frac{-2\zeta}{V_s^2[T_{S_o}^2 V_s^2 + x_r^2]}$$

wherein $\zeta = \gamma_{eff}^2 \eta$; and $\gamma_{eff} = \frac{1}{\left((1+\gamma_0)\left(\left(\frac{V_c^2}{V_p^2}\right)-1\right)\right)}$ in which:
T=travel time,
($T_g$)=upgoing travel time,
($T_s$)=downgoing travel time,
CC=an empirically derived constant
$c_{1_s}$, $c_{2_s}$, $c_{3_s}$ and $c_{4_s}$ represent the shear (S) wave series coefficients,
$c_{1_p}$, $c_{2_p}$, $c_{3_p}$ and $c_{4_p}$ represent the compressional (P) wave series coefficients,
$T_{g_o}$ and $T_{s_o}$ represent a fourth order approximation to travel time of the seismic energy from the image point to the receiver position and the source position to the image point, respectively,
Vp=compressional wave velocity,
Vs=shear wave velocity,
Vc=converted wave velocity, and
η=an anelliptic parameter.

7. A computer program stored in a compute readable medium, the program having logic operable to cause a programmable computer to perform actions on seismic data, the acts comprising:
determining travel time of a compressional wave from a source location to a scatter point using a sixth order series expansion travel time equation that accounts for ray bending at interfaces between subsurface strata, the equation optimized to minimize truncation effects;
determining a travel time of a shear wave from the scatter point to a receiver location using a sixth order series expansion travel time equation that accounts for ray bending at interfaces between subsurface strata, the equation optimized to minimize truncation effects;
using the determined travel times to migrate the seismic data to an image point; and at least one of storing and displaying the migrated seismic data.

8. The program of claim 7 wherein the travel times are calculated for isotropic media.

9. The program of claim 7 wherein the travel times are calculated for transversely isotropic media with a vertical axis of symmetry.

10. The program of claim 7 wherein the source is near the sea surface, the receiver is on the sea floor and the compressional wave velocity is modified to include the travel time of the wave through the water layer.

11. The program of claim 7 wherein the optimized sixth order series expansion travel time equation is:

$$T = T_g + T_s = T_{g_o}\left(1 + \frac{1}{2}CC\frac{c_{4_s}x_r^6}{T_{g_o}^2}\right) + T_{s_o}\left(1 + \frac{1}{2}CC\frac{c_{4_p}x_s^6}{T_{s_o}^2}\right)$$

in which, $$T_{g_o} = \sqrt{(c_{1_s} + c_{2_s}x^2 + c_{3_s}x^4)}, \quad T_{s_o} = \sqrt{(c_{1_p} + c_{2_p}x^2 + c_{3_p}x^4)}$$

in which:
T=travel time,
($T_g$)=upgoing travel time,
($T_s$)=downgoing travel time,
CC=an empirically derived constant,
x=a distance between the image point and a respective one of the source location and the receiver location,
$c_{1_s}$, $c_{2_s}$, $c_{3_s}$ and $c_{4_s}$ represent shear (S) wave series coefficients,
$c_{1_p}$, $c_{2_p}$, $c_{3_p}$ and $c_{4_p}$ represent compressional (P) wave series coefficients, and
$T_{g_o}$ and $T_{s_o}$ represent a fourth order approximation of travel time of seismic energy from the image point to the receiver position and from the source position to the image point, respectively.

12. The program of claim 11 wherein the optimized sixth order series expansion travel time equation accounts for ray bending in a transversely isotropic media with a vertical symmetry axis (VTI) is:

$$T = T_g + T_s - \Delta T = T_{g_o}\left(1 + \frac{1}{2}CC\frac{c_{4_s}x_r^6}{T_{g_o}^2}\right) + T_{s_o}\left(1 + \frac{1}{2}CC\frac{c_{4_p}x_s^6}{T_{s_o}^2}\right) - \Delta T(VTI)$$

wherein, $$T_{g_o} = \sqrt{(c_{1_s} + c_{2_s}x^2 + c_{3_s}x^4)}, \quad T_{s_o} = \sqrt{(c_{1_p} + c_{2_p}x^2 + c_{3_p}x^4)}$$

$$\Delta T = \frac{C_p(VTI)x_s^4}{2\sqrt{T_{P_o}^2 + \frac{x_s^2}{V_{p2}^2}}} + \frac{C_s(VTI)x_r^4}{2\sqrt{T_{S_o}^2 + \frac{x_r^2}{V_{s2}^2}}}$$

$$C_p(VTI) = \frac{2\eta}{V_p^2[T_{P_o}^2 V_p^2 + (1+2\eta)x_s^2]}, \text{ and } C_s(VTI) = \frac{-2\zeta}{V_s^2[T_{S_o}^2 V_s^2 + x_r^2]}$$

wherein $\zeta = \gamma_{eff}^2 \eta$; and $\gamma_{eff} = \frac{1}{\left((1+\gamma_0)\left(\left(\frac{V_c^2}{V_p^2}\right)-1\right)\right)}$ in which:
T=travel time,
($T_g$)=upgoing travel time, $(T_s)$=downgoing travel time,
CC=an empirically derived constant
$c_{1_s}$, $c_{2_s}$, $c_{3_s}$ and $c_{4_s}$ represent the shear (S) wave series coefficients,
$c_{1_p}$, $c_{2_p}$, $c_{3_p}$ and $c_{4_p}$ represent the compressional (P) wave series coefficients,
$T_{g_o}$ and $T_{s_o}$ represent a fourth order approximation to travel time of the seismic energy from the image point to the receiver position and the source position to the image point, respectively,
Vp=compressional wave velocity,
Vs-shear wave velocity,
Vc=converted wave velocity, and
η=an anelliptic parameter.

* * * * *